United States Patent [19]
Kwan

[11] Patent Number: 5,849,074
[45] Date of Patent: Dec. 15, 1998

[54] METHOD FOR PREPARING MAGNETIC INK AND DRY PIGMENT PARTICLES USED THEREFOR

[75] Inventor: Wing Sum Vincent Kwan, Deerfield, Ill.

[73] Assignee: Videojet Systems International, Inc., Wood Dale, Ill.

[21] Appl. No.: 684,417

[22] Filed: Jul. 19, 1996

Related U.S. Application Data

[60] Provisional application No. 60/004,701, Oct. 3, 1995.

[51] Int. Cl.$^6$ .................................................. C09C 1/22
[52] U.S. Cl. .......................... 106/460; 106/456; 106/457; 106/459; 106/499; 252/62.56; 252/62.59; 428/69.4 XS
[58] Field of Search .............. 252/62.59, 62.56; 428/694 S; 106/460, 499, 456, 457, 459

[56] References Cited

U.S. PATENT DOCUMENTS

| | | | |
|---|---|---|---|
| 3,348,959 | 10/1967 | Csonka et al. | 106/471 |
| 3,398,113 | 8/1968 | Godshalk et al. | 524/197 |
| 3,453,130 | 7/1969 | Feld | 106/447 |
| 4,160,760 | 7/1979 | Carr et al. | 523/333 |
| 4,277,288 | 7/1981 | Lawrence et al. | 106/413 |
| 4,545,821 | 10/1985 | Rau et al. | 106/48 |
| 4,913,063 | 4/1990 | Jonas et al. | 106/413 |
| 5,420,317 | 5/1995 | Laufenberg et al. | 554/163 |
| 5,501,732 | 3/1996 | Neidenzu et al. | 106/447 |

FOREIGN PATENT DOCUMENTS

| | | |
|---|---|---|
| 0 707 051 | 4/1996 | European Pat. Off. . |
| 2 281 410 | 3/1976 | France . |
| 2673838 | 9/1992 | France . |
| 1 959 233 | 6/1970 | Germany . |
| 2 043 629 | 3/1972 | Germany . |
| 2 313 073 | 9/1974 | Germany . |
| 51-082317 | 7/1976 | Japan . |
| 59-170130 | 9/1984 | Japan . |
| 59-170131 | 9/1984 | Japan . |
| 60-079068 | 5/1985 | Japan . |
| 62-267368 | 11/1987 | Japan .................................. 106/460 |
| 6115945 | 4/1994 | Japan . |
| 6145025 | 5/1994 | Japan . |
| 07053910 | 2/1995 | Japan . |
| 07165986 | 6/1995 | Japan . |
| 8109022 | 4/1996 | Japan . |
| 1104939 | 3/1968 | United Kingdom . |
| 1 287 576 | 8/1972 | United Kingdom . |
| 1 460 315 | 1/1977 | United Kingdom . |
| 1 494 746 | 12/1977 | United Kingdom . |

OTHER PUBLICATIONS

PCT Search Report, Dec. 10, 1996, (GB 96/02415).
Hawley's Condensed Chemical Dictionary, 11$^{th}$ ed. pp. 695 and 838, Van Nostrand, N.Y., 1987 (No Month).
Hyperdispersants, Schofield, J.D., Surface Coatings Institute (JOCCA), 74(6), pp. 204, 206–210, Jun. 1991.
A Model for Organic pigments in Oil or Water–Based Printing Inks, Hays, B.G., Am. Ink Maker, v. 64, pp., 13–21, Oct. 1986.

*Primary Examiner*—Mark L. Bell
*Assistant Examiner*—Scott L. Hertzog
*Attorney, Agent, or Firm*—Leydig, Voit & Mayer, Ltd.

[57] ABSTRACT

A method for making magnetic ink compositions is disclosed. The magnetic particles used in the ink are prepared from an aqueous slurry. A surface derivatizing agent is added to the slurry to render the magnetic pigment particles hydrophobic. The particles then sink to the bottom of the slurry, and the bulk water is then removed. After air drying, dry magnetic pigment particles are provided. The particles will be hydrophobic, and thus will have superior resistance to water as compared to previously known magnetic pigment particles. Magnetic ink compositions are formulated from the magnetic particles.

15 Claims, No Drawings

METHOD FOR PREPARING MAGNETIC INK AND DRY PIGMENT PARTICLES USED THEREFOR

CROSS-REFERENCE TO A RELATED APPLICATION

This application claims priority from the United States provisional patent application, Ser. No. 60/004,701, filed Oct. 3, 1995.

TECHNICAL FIELD OF THE INVENTION

The present invention is directed to, in one aspect, the field of inks, such as magnetic check-printing inks. The invention is also directed to the field of magnetic media. More specifically, the present invention is directed towards a method of preparation of dry magnetic pigment particles for use in preparing inks or magnetic media.

BACKGROUND OF THE INVENTION

Magnetic pigment particles are widely used in a number of industrial and consumer applications. Typically, the magnetic pigment particles comprise small particles of a transition metal oxide, such as iron or chromium oxide, that may be coated onto a substrate and used to magnetically store information. Such particles may be used, for example, in magnetic inks used on checks, in machine-readable information media such as the magnetic strip on the back of a credit card, or in magnetic recording media such as videotapes and computer disk drives.

Magnetic pigment particles typically are prepared by preparing an aqueous slurry of the pigment particles and filtering the slurry to remove bulk water. *Ullman's Encyclopedia of Industrial Chemistry*, vol. A20 (1984), for example, describes the Laux process for preparing iron oxide particles. Iron filings and iron (II) chloride are reacted with a nitro compound such as nitrobenzene in the presence of sulfuric and phosphoric acids. The nitro compound is reduced to an amine (aniline in the case of nitrobenzene) which is removed by steam distillation, while the iron is oxidized to form iron (II) and iron (III) oxide. The iron oxide is provided in an aqueous slurry, filtration of which yields iron oxide particles.

Because iron oxide particles are extremely hydrophilic, filtration of the slurry is not effective to remove the water bound to the surfaces of the particles. Typically, from about 10% to about 30% water by weight of the iron particles remains bound to the particle surfaces. Accordingly, the particles must be heated to a temperature of at least about 110° C. to remove the bound water. Heating the particles in this fashion causes a number of problems in the preparation of dry particles. A principal problem arises from the agglomeration of the iron oxide particles into a cake during the heating step. The cake must be milled to render particulate iron oxide. Such milling processes are expensive and time consuming, inasmuch as conventional applications require small particle size. In addition, particle size must be determined in the milling phase. Different applications require different particle sizes, and therefore, different milling processes may be required for different applications.

Further problems arise from the pigment particles themselves. The pigment particles produced by such a prior art process will remain hydrophilic, even after the bound water has been driven off by heating. This can make the particles difficult to work with, as they may readily attract and bind water from humidity or other sources of moisture. For example, in lithographic printing of checks, care must be taken to prevent the magnetized inks from contact with moisture to prevent the pigment particles from emulsifying with the organic ink base. In addition, lithographic printing of magnetic particle inks onto checks typically requires contacting the printed checks with an aqueous fountain solution, thus further risking agglomeration of the pigment particles within the ink.

A need therefore exists for a method for preparing dry magnetic pigment particles, such as iron oxide particles, from an aqueous slurry in a manner that does not require subsequent heating of the particles to remove bound water. A need also exists for a facile process to obtain a dry, hydrophobic magnetic pigment particle from an aqueous slurry.

BRIEF SUMMARY OF THE INVENTION

In accordance with the present invention, a surface derivatizing agent is added to an aqueous slurry of pigment particles. The derivatizing agent is added in sufficient quantity to cause the particles to sink to the bottom of the slurry. An optional heating step may be employed to facilitate the settling of the particles. After the particles have so settled to the bottom, the bulk water may then be removed, as by decanting. Subsequently, the particles may be air dried to form, dry, hydrophobic magnetic pigment particles.

The amount of water bound to the particles preferably will be reduced to about 1% or less by weight, based on the weight of the dry particles. Thus, the particles are suitable for use in any number of conventional applications. In addition, the particles will have superior resistance to water as compared to previously known magnetic pigment particles, and thus will be preferred over conventionally prepared pigment particles when used in conventional applications.

In one embodiment of the present invention, a method for preparing dry magnetic pigment particles is provided. The method comprises the steps of (a) providing an aqueous slurry of magnetic pigment particles; (b) adding to the slurry a surface derivatizing agent in an amount effective to render the pigment particles hydrophobic; and (c) removing water from the aqueous slurry. Optionally, the particles may then be dried to thereby form dry magnetic pigment particles.

The magnetic pigment particles so prepared may be used to formulate magnetic printing inks, as well as other magnetic recording systems, such as audio and video tapes, magnetic storage disks, and other magnetic storage and readable systems. Also falling within the scope of the present invention are dry magnetic pigment particles prepared according to the preferred method.

DESCRIPTION OF THE PREFERRED EMBODIMENTS

As indicated, the present invention, in one aspect, provides a method for preparing a magnetic ink, comprising the steps of:

(a) providing an aqueous slurry of magnetic pigment particles;

(b) adding to said slurry a surface derivatizing agent in an amount effective to render said pigment particles hydrophobic;

(c) removing water from said aqueous slurry to thereby form dry magnetic pigment particles; and (d) mixing said dry magnetic pigment particles with an ink vehicle to thereby form said magnetic ink.

The step of removing water may be accomplished by decanting said water, or by other suitable means.

Preferably the amount of surface derivatizing agent is from about 1% to about 5% by weight of said magnetic pigment particles in said slurry, and more preferably from about 1% to about 2% by weight of said magnetic pigment particles in said slurry. Typically the aqueous slurry contains from about 2% to about 200% pigment particles by weight, more typically from about 15% to about 20% pigment particles by weight.

Optionally, one may heat the aqueous slurry containing said surface derivatizing agent to a temperature effective to allow the surface derivatizing agent to displace water on the surface of the magnetic pigment particles prior to said step of removing water from said aqueous slurry. Such heating may be done at a temperature from about 70° to about 80° C.

More generally, the present invention as described above may be used to prepare magnetic pigment particles, by:

(a) providing an aqueous slurry of magnetic pigment particles; and
(b) adding to said slurry a surface derivatizing agent in an amount effective to cause the pigment particles to settle.

The Magnetic Particles

The method of the present invention has utility in preparing any number of dry magnetic pigment particles. By "magnetic pigment particles" is meant any ferromagnetic particulate matter.

The magnetic metal particles of use in the present invention are usually iron oxide, such as cubic iron oxide, acicular iron oxide, gamma-$Fe_2O_3$, and mixed crystals of gamma-$Fe_2O_3$ and $Fe_3O_4$ any of which may be doped with cobalt. The particles also may be, however, $Cr_2O_2$, gamma $Fe_2O_3$ or $Fe_3O_4$ coated with cobalt, barium ferrite, strontium ferrite, iron carbide, pure iron, and ferromagnetic alloy powders such as Fe—Co, Fe—Co—Ni, Fe—Co—Co—Ni, Fe—Co—B, Fe—Co—Cr—B, Mn—Bi, Mn—Al, Fe—Co—V alloys, or iron nitride or other similar magnetic particles.

Preferably, the magnetic pigment particles include iron; most preferably, the pigment particles comprise iron oxide particles. Of course, other transition metal oxides, such as chromium, manganese, and the like, may be included in lieu of or in addition to iron. The preferred iron oxide particles are those available from Wright Industries, Brooklyn, N.Y. Iron oxide particles come in a variety of colors, such as black, red, or yellow, depending on a number of factors such as the oxidation state of iron. Chromium oxide particles typically are yellow or gold. In many applications, the color of the pigment particles will be irrelevant or of secondary importance, so long as the pigment particles are ferromagnetic. When the iron oxide particles are used in lithographic printing inks for checks, the preferred particle is a mixture of iron (II) and iron (III) oxide.

There are no specific limitations on the particle sizes of the magnetic pigment particles that may be prepared by the present invention, although a practical lower limit on the particle size of a magnetic pigment particle is about 0.7 microns. In general, the particle size should be from about 0.1 microns to about 100 microns, typically from about 0.2 to about 5 microns, preferably from about 0.2 to about 2 micron. Preferably, the particle size does not exceed 5 microns, although this depends on the particular application to which the particles are put. For example, as set forth above, when the particles are to be used as pigments for lithographic printing onto checks, the particle size preferably is in the range of 0.7 to 2 microns. When the particles are prepared for eventual use on machine-readable magnetic media such as magnetic strips on a credit card, the particle size should be in the range of about 0.2 to about 1 micron. When used in magnetic recording media, the particle size should be in the range of about 0.2 to about 1 micron. In general, smaller particles are easier to disperse in carrier media when preparing magnetic check printing inks. Moreover, smaller particles yield a greater density than larger particles, thus resulting in a higher signal strength.

The Slurry

The process includes the step of providing an aqueous slurry of magnetic pigment particles. Any conventional process may be used to prepare such a slurry. When the magnetic pigment is iron oxide, the Laux process, as described supra, preferably is used to prepare the slurry. This process is preferred because it provides aniline, a useful compound, in addition to an aqueous slurry of pigment particles, and because harmful environmental emissions are maintained at a minimum. The amount of pigment in the aqueous slurry preferably is in the range of from about 20 to about 20% by weight, preferably, from about 10% to about 20%.

The Surface Derivatizing Agent

A surface derivatizing agent is added to the slurry in an amount effective to cause the particles to settle. It is believed that such an effective amount will render the particles hydrophobic. The surface derivatizing agent is typically a surface active agent that is cationic, anionic or nonionic.

The surface derivatizing agent preferably is selected from the group consisting of alkylated phenol compounds, 1,3-diketo alkyl derivative compounds, o-phenol alkyl(1-) ketone derivative compounds, and titanate compounds. However, it should be understood that any surface derivatizing compound that renders the magnetic particles hydrophobic may be used in carrying out the present invention. Other compounds useful as surface derivatizing agents in the present invention will be described hereinafter.

Alkylated phenol compounds comprise a family of compounds in which an alkyl "tail" is added to phenol. Nonylphenols, such as (4'nonyl)phenol, are preferred among the alkylated phenol compounds. For example, (4'nonyl) phenol has the following structure:

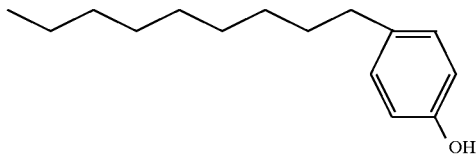

This compound has a nine-carbon alkyl tail. Other isomers of nonylphenol, including those having a branched tail, and including other positional isomers, may be used, as may mixtures of alkylated phenol compounds or isomers. Additional alkylated phenol compounds suitable for use with the methods of the present invention include, for example, compounds with shorter tails, such as pentylphenol and hexylphenol, and those with longer tails, such as decylphenol, undecylphenol, and so forth. In general, longer tails are preferred; however, nonylphenol is the preferred compound of the alkylated phenol compounds, inasmuch as it is inexpensive and widely commercially available. A particularly preferred nonylphenol mixture is that available under the designation Product No. 29085-8 from Aldrich Chemical Co. Inc., Milwaukee, Wis. This product comprises a mixture of isomers of nonylphenol.

While not wishing to limit the invention to a particular theory or mode of operation, it is believed that the phenolic oxygen has a high affinity for the magnetic metal particle, and forms a coordinated complex with the particle. The long alkyl tail creates a hydrophobic micelle around the particle, and thus effectively renders the particle hydrophobic.

The terms "alkyl" or "alkylated" as used in this application are intended to encompass other moieties in addition to as pure alkyl chains, and include alkenyl and alkynyl chains as well as aliphatic chains, generally, that contain functional groups. It is only necessary for the aliphatic chain to render the magnetic pigment particle hydrophobic. The alkyl moiety, or an alkenyl or alkynyl analog, will typically have from about 6 to 24 carbon atoms, and more typically from about 8 to 18 carbon atoms.

Alternatively, or in addition thereto, the surface derivatizing agent may comprise a 1,3-diketo alkyl derivative. These compounds may be defined as alkyl analogs of acetylacetic acid, which has the following formula:

Useful derivatives of this compound may include alkyl acids, aldehydes, ketones, and esters. A particularly preferred 1,3-diketo alkyl compound is ethylacetoacetate, such as that available from Aldrich Chemical Co., Inc., Milwaukee, Wis. While not wishing to limit the present invention to a particular theory or mode of operation, it is believed that the two carbonyl groups present in those compounds allow these compounds to form a chelate with magnetic pigment particles. The particles thus are rendered hydrophobic, and may be readily separated from aqueous solution.

Another class of compound useful in the present invention are o-phenol alkyl(1-)ketone derivatives. As discussed above, the term "alkyl" includes other moieties in addition to pure alkyl chains. The preferred compound in this class is 2'-hydroxyacetophenone (HAP), which has the following formula:

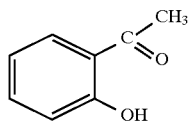

Other derivatives may include acids, aldehydes, ketones, and esters. For example, ethyl salicylate, such as that available from Aldrich Chemical Co., Inc., Milwaukee, Wis., also is a surface derivatizing agent useful in the methods of the present invention. It is believed that the hydroxy and carbonyl oxygen atoms form a chelate with the metal pigment particle, thus rendering the particle hydrophobic.

Yet another class of compounds useful in the present invention are titanium esters, or titanates. Titanates may generally be defined as compounds of the general formula:

wherein R is any organic moiety and n is at least 2. The titanium atom also may be substituted with other organic or inorganic substituents. A preferred titanate is isopropyl triisostearyl titanate, sold under the trade name XR TTS by Kenrich Petrochemicals, Inc., Bayonne, N.J. This compound has the following formula:

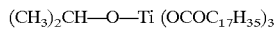

Titanates in general are less preferred than other types of surface derivatizing agents, inasmuch as titanates are not stable in acidic aqueous media. When the magnetic pigment particles are formulated into check-printing inks, they will contact an aqueous fountain solution having a pH of about 3.5 to about 5.0 during the lithographic printing process. The titanates may be destroyed, causing the pigment particles again to become hydrophilic and to agglomerate. Titanates also are believed to function by reaction on hydroxy groups on metal oxide surface.

Other phenolic compounds suitable for use as surface derivatizing agents include compounds of the following general formula.

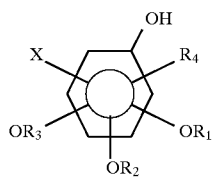

wherein $R_1$, $R_2$, and $R_3$ are the same or different and represent a straight-chain or branched-chain, alkyl, alkenyl, or alkynyl moiety of from 1–50 carbon atoms;

X is halogen; and $R_4$, is phenyl, alkenyl, alkyl, or alkynyl. Any one or all of the foregoing substituents $OR_1$, $OR_2$, $OR_3$, X, and $R_4$ may be omitted, so long as at least one of these substituents is present on the phenol ring. For example, o-methoxyphenol may be used as a surface derivatizing agent, as may p-chlorophenol. The phenyl ring and any of $R_1$–$R_4$ may include substituents that do not interfere with the function of the surface derivatizing agent, such as hydroxy, carbonyl, alkyl, alkenyl, alkynyl, alkoxy, or any other substituent that allows the compound to function as a surface derivatizing agent.

The surface derivatizing agent also may include a naphthalene derivative, such as a compound of the following formula:

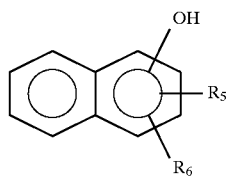

wherein —OH represents 1- or 2-hydroxy naphthalene and wherein $R_5$ and $R_6$ are nothing or are substituents that do not interfere with the function of the naphthalene derivative as a surface derivatizing agent. Preferably, $R_5$ and $R_6$ are straight-chain or branched-chain alkyl, alkenyl, or alkynyl of from 1–50 carbon atoms, or $R_5$ is an acetyl group and $R_6$ is nothing. When $R_5$ is an acetyl group, the naphthalene derivative compound preferably is 2-acetyl-1-naphthol or 3-acetyl-2-naphthol.

Other compounds suitable as surface derivatizing agents include ring-added hydroxyquinone derivatives, such as 2-hydroxy-1,4-naphthoquinone, 2-hydroxy-1,4-anthracenequinone, and so forth. The unsaturated rings may be substituted with any functional group or groups that do not interfere with the function of the hydroxyquinone derivative as a surface derivatizing agent.

Other compounds suitable for use as surface derivatizing agents include the following compounds and derivatives thereof:

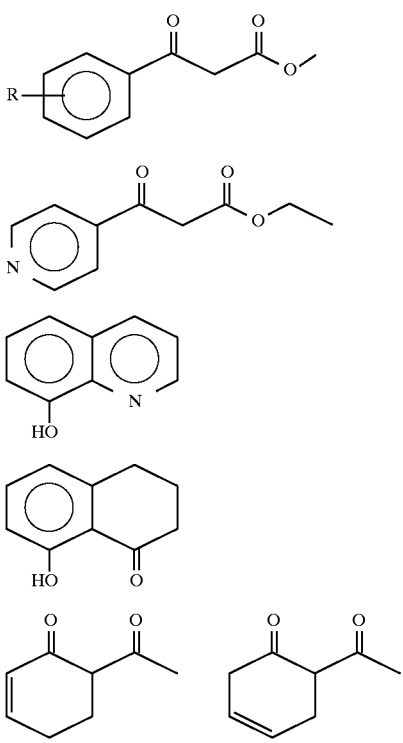

Again, the foregoing compounds may be substituted with any functional group or groups that do not interfere with the function of the surface compound as a derivatizing agent, such as halo, alkylhalo (such as $CF_3$), et al. The compounds may be saturated or unsaturated, or partially saturated, and may be substituted in ortho, para, or meta positions.

The foregoing represent only a few of the surface derivatizing agents that may be used in conjunction with the present invention. It should be understood, however, that the invention is not limited thereto. Indeed, any surface derivatizing agent may be used, so long as it renders the metallic pigment particles hydrophobic.

The surface derivatizing agent may be added in an amount from about 1% to about 10% by weight of the pigment particles in the aqueous slurry, preferably, from about 1% to about 5%. It is only necessary that the surface derivatizing agent be added in an amount effective to render the pigment particles hydrophobic. For economic reasons, smaller amounts of surface derivatizing agent are preferred, and the addition of amounts greater than about 1% has not been observed to enhance significantly the hydrophobic-imparting effect. Accordingly, an especially preferred range is from about 1% to about 2% by weight of surface derivatizing agent.

After the surface derivatizing agent has been added, the solution may be heated to allow the surface derivatizing agent to displace water on the surface of the magnetic pigment particles. Preferably, the solution is heated to a temperature of about 70°–80° C., although other temperature ranges also may be appropriate. For example, another preferred temperature range is from about 65° C. to about 75° C. If the solution is not so heated, the pigment particles still will become hydrophobic; however, it has been observed that the method of the present invention is most effective when the pigment particles have been heated.

The magnetic pigment particles will sink to the bottom of the vessel containing the aqueous slurry, although some of the particles may remain suspended. The bulk water in the slurry then is removed. Unlike prior art methods of separating water, the slurry need not undergo exhaustive vacuum filtration, and most of the water may be removed by decanting. The magnetic pigment particles preferably are then air dried, to remove the remaining bulk water. Preferably, the particles are dried on a continuous conveyer having a drainage system for removing water. The pigment particles preferably are not heated or further oxidized after air drying, but rather are used directly in the preparation of magnetic media.

The methods of the present invention result in a dry magnetic pigment particle. By "dry" is meant that most or substantially all of the weight of the pigment particles comprises the surface-derivatized particles themselves, and not water. Preferably, the amount of water that remains bound to the surface of the particles is less than about 1% by weight of the particles. The pigment particles thus produced will be suitable for conventional applications such as lithographic check-printing inks and magnetic recording media. In addition, the magnetic pigment particles will be hydrophobic, and will be particularly resistant to agglomeration. The dry magnetic pigment particles further will be resistant to attack from acids and bases in many cases. Finally, the pigment particles will be more heat resistant, and resistant to air oxidation. The particle size of the pigment particles may be controlled to some extent by varying the shearing force of the mixer used to mix the surface derivatizing agent with the aqueous slurry of pigment particles. In any event, the pigment particles ordinarily will not require milling after preparation.

Magnetic Recording Media

It is typical for magnetic recording media, such as tapes and discs, to be made by applying a magnetic coating to a substrate, typically a polymeric substrate, and most typically a polyethylene terephthalic film. The magnetic particles of the present invention may be applied to a suitable substrate to form a magnetic recording medium by manners well known in the art. For example, the particles may be dispersed in a suitable binder, such as vinyl chloride/vinyl acetate copolymers, vinyl chloride/vinyl acetate/vinyl alcohol polymers, vinyl chloride/vinylidene chloride copolymers, polyurethane resins, polyester resins, acrylonitrile/butadiene copolymers, nitrocellulose, cellulose acetate butyrate, epoxy resins, and acrylic resins.

The magnetic particles, a binder resin, and if necessary, one or more various additives may be mixed together with an organic solvent to prepare a magnetic coating formulation. Any additives can be added to the magnetic coating formulation as needed. A variety of materials conventionally known as additives for magnetic coating formulations can be suitably used, such as lubricants, abrasives, dispersants, antistatic agents and fillers.

Further, exemplary solvents usable for the preparation of the magnetic coating formulation include ketones, e.g., acetone, methyl ethyl ketone, methyl isobutyl ketone and cyclohexanone; alcohols, e.g., methanol, ethanol, propanol, and butanol; esters, e.g., methyl acetate, ethyl acetate and butyl acetate; glycol ethers, e.g., propylene glycol monomethyl ether, ethylene glycol monoethyl ether and dioxane; the acetate esters of glycol ethers, e.g., ethylene glycol monoethyl ether acetate and propylene glycol monomethyl ether acetate; aromatic hydrocarbons, e.g., benzene, cyclohexanone, toluene and xylene; aliphatic hydrocarbons, e.g., hexane and heptane; nitropropane; tetrahydrofuran; dimethylacetamide; and dimethylformamide and mixtures thereof. The most preferred solvent is a mixture of 60% methyl ethylene ketone, 20% cyclohexanone, 20% toluene.

Binders with various resins incorporated therein have conventionally been used as binders for magnetic recording media. Among these, useful are polyurethane resins, vinyl chloride-vinyl acetate copolymer resins, and the like.

Production of the magnetic recording medium according to the present invention can be conducted in a similar manner to either one of conventional processes. For example, the binder, magnetic particles and if necessary, one or more of various additives are mixed together with an organic solvent to prepare a magnetic coating formulation.

The magnetic coating formulation may then be placed onto a substrate as discussed above, which may be a film or synthetic disk. After the coating formulation is dried, a surface treatment such as calendar rolling may be applied. Thus, the present invention provides a magnetic recording medium comprising a nonmetallic support and a metallic layer formed thereon that is made of a composition comprising magnetic particles and a resinous binder, wherein the magnetic particles have been obtained from an aqueous slurry in accordance with the present invention.

The magnetic recording media made in accordance with the present invention may exhibit extremely good signal to noise characteristics. This should be achievable in view of the fact that the magnetic particles of the present invention are very uniform in size and properties, and can be deposited in an extremely uniform manner onto a substrate, without agglomeration of the particles. The resulting coating should be very smooth and abrasion resistant, giving rise to long useful lives for the recording media.

Magnetic Ink

The present invention also encompasses a method for preparing magnetic ink. In accordance with the present invention, the magnetic pigment particles are prepared as set forth above, and are mixed with an ink vehicle to thereby prepare a magnetic ink. The magnetic ink is useful, for example, as a check-printing ink.

An ink can then be made by dispersing the magnetic particles into a suitable vehicle, followed by mixing the composition for a sufficient time to form the desired ink. In one aspect, the ink is free of volatile organic solvents. Usually the vehicle is present in an amount from about 1 to about 90 percent, based on the total weight of the particles. The preferred formulation of check-printing ink includes the following ingredients:

| Ingredient | Weight percent |
| --- | --- |
| Magnetic pigment particles | 61.5 |
| Sun 16-V-10 | 6.0 |
| Superior Vehicle Litho 6848 | 16.0 |
| Superior Vehicle Litho 4895 | 12.0 |
| Linseed Oil | 4.5 |

Sun 16-V-10 is a commercially available ink vehicle sold by Sun Chemicals, Carlstadt, N.J. This vehicle includes rosin modified alkyd phenolic resin, oxidated linseed oil polymer, and polymerized linseed oil. Superior Vehicle Litho 4895 and Superior Vehicle Litho 6848 are vehicles that are commercially available from Superior Varnish & Driers, Pennsauken, N.J. To prepare the ink, the foregoing ingredients are blended to form a homogenous mixture under standard conditions for the preparation of inks.

The following examples further illustrate the present invention but, of course, should not be construed as in any way limiting its scope.

EXAMPLE 1

This Example illustrates the effectiveness of HAP as a surface derivatizing agent, and evaluates this agent when used in varying amounts.

An aqueous slurry including 40 g of iron oxide was prepared and provided. HAP was added, and the iron oxide particles allowed to settle to the bottom of the container. Bulk water then was decanted, and the aqueous slurry allowed to dry. The amount of water remaining in the pigment particles then was evaluated.

| Amount of HAP (by % weight of pigment) | Water removal (weight %) |
| --- | --- |
| 1 | 99.0 |
| 5 | 99.5 |
| 10 | 99.1 |

Water removal was evaluated by heating the pigment particles to drive off bound water. The weight of the dried pigment particles was expressed as a percentage of the weight of the particles as originally prepared.

It is thus seen that HAP imparts a high level of hydrophobicity to iron oxide pigment, even when added at very low levels.

EXAMPLE 2

This Example demonstrates the effects of modifying the percentage of pigment in the aqueous slurry.

HAP was added to the following slurries and dry pigment particles prepared therefrom. Water removal was evaluated as in Example 1.

| Amount of pigment (% pigment in slurry) | Water removal (weight %) |
| --- | --- |
| 2 | 99.5 |
| 10 | 94.3 |
| 20 | 99.0 |

It is thus seen that the method of the present invention is effective for slurries containing various amounts of magnetic pigment particles.

EXAMPLE 3

This Example comparatively evaluates the surface derivatizing agents of the present invention.

A 20% pigment slurry was prepared. The surface derivatizing agent was added in an amount of 5% by weight of the pigment particles. Water was decanted, and the particles allowed to air dry. Water removal was evaluated as in Example 1.

| Compound Tested | Water removal |
| --- | --- |
| 2'-hydroxyacetophenone | 99.5% |
| nonylphenol (mixture of isomers | 94.0 |
| XR TTS | 97.0 |
| Ethylacetoacetate | 96.5 |
| Ethyl Salicylate | 95.3 |

The present invention thus provides a method for preparing dry magnetic pigment particles that satisfies the general objects set forth above. Heating of the particles is not necessary to drive off water, and thus the attendant disadvantages are avoided. In addition, the particles provided by the present invention are hydrophobic, and thus are particularly suited for use in a number of conventional applications.

While particular embodiments of the invention have been shown, it will of course be understood that the invention is not limited thereto since modifications may be made by those skilled in the art, particularly in light of the foregoing teachings. For example, surface derivatizing agents other than those set forth in the specification may be used. It is, therefore, contemplated by the present invention to cover any such modifications as incorporate those features which constitute the essential features of these improvements within the true spirit and scope of the invention. All references cited herein are hereby incorporated by reference in their entireties.

What is claimed is:

1. A method for preparing modified iron oxide containing pigment particles, comprising contacting an aqueous slurry of iron oxide containing pigment particles with a surface derivatizing agent having one or more phenolic and 1,3-diketo moieties or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof.

2. The method of claim 1, where the surface derivatizing agent is a phenol substituted with an unsubstituted alkyl group or an alkylcarbonyl group.

3. The method of claim 2, where the surface derivatizing agent is added in an amount less than about 10% by weight of the pigment particles.

4. The method of claim 2, where the surface derivatizing agent is nonylphenol.

5. The method of claim 2, where the surface derivatizing agent is dinonylphenol.

6. The method of claim 2, where the surface derivatizing agent is 2'-hydroxyacetophenone.

7. The method of claim 2, where the aqueous slurry of pigment particles contains from about 8% to about 12% pigment particles by weight of the slurry.

8. A method for preparing hydrophobic iron oxide pigment particles, comprising preparing an aqueous slurry of iron oxide containing pigment particles, such that the pigment particles are present in an amount from about 2% to about 20% by weight of the slurry; adding a surface derivatizing agent having one or more phenolic and 1,3-diketo moieties or a surface derivatizing agent which is a phenol substituted with one or more substituents selected from the group consisting of cycloalkyl, alkenyl, alkynyl, alkoxy, keto, diketo, pyrido, benzo, alkylcarbonyl, halo, cycloalkylcarbonyl, hydroxyalkyl, haloalkyl, alkoxyalkyl, unsubstituted alkyl, and combinations thereof to the slurry in an amount less than about 10% by weight of the pigment particles; mixing the surface derivatizing agent into the slurry to render the pigment particles hydrophobic; and recovering and drying the hydrophobic pigment particles.

9. The method of claim 8, where the aqueous slurry of pigment particles contains from about 8% to about 12% pigment particles by weight of the slurry.

10. The method of claim 9, where the surface derivatizing agent is nonylphenol.

11. The method of claim 9, where the surface derivatizing agent is dinonylphenol.

12. The method of claim 9, where the surface derivatizing agent is 2'-hydroxyacetophenone.

13. The method of claim 9, where the surface derivatizing agent is added in an amount less than about 5% by weight of the pigment particles.

14. The method of claim 13, where the surface derivatizing agent is mixed into the slurry at a temperature from about 70° C. to about 80° C.

15. Magnetic recording media, comprising modified iron oxide containing pigment made in accordance with the method of claim 1.

* * * * *